United States Patent
Calvignac et al.

(10) Patent No.: US 6,681,340 B2
(45) Date of Patent: Jan. 20, 2004

(54) EFFICIENT IMPLEMENTATION OF ERROR CORRECTION CODE SCHEME

(75) Inventors: Jean Louis Calvignac, Cary, NC (US); Marco C. Heddes, Raleigh, NC (US); Joseph Franklin Logan, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 09/792,533

(22) Filed: Feb. 23, 2001

(65) Prior Publication Data

US 2002/0120890 A1 Aug. 29, 2002

(51) Int. Cl.$^7$ ............................................... G06F 11/10
(52) U.S. Cl. ............................................ 714/18; 714/776
(58) Field of Search ................................... 714/18, 776

(56) References Cited

U.S. PATENT DOCUMENTS

| | | | |
|---|---|---|---|
| 5,146,461 A | 9/1992 | Duschatko et al. | 371/40.1 |
| 5,373,512 A | 12/1994 | Brady | 371/40.1 |
| 5,612,965 A | 3/1997 | Michaelson | 371/49.1 |
| 5,740,188 A | 4/1998 | Olarig | 371/40.11 |
| 5,875,192 A * | 2/1999 | Cam et al. | 370/395.7 |
| RE36,448 E | 12/1999 | Brady | 714/763 |
| 6,101,614 A | 8/2000 | Gonzales et al. | 714/6 |

* cited by examiner

Primary Examiner—Stephen M. Baker
(74) Attorney, Agent, or Firm—Winstead, Sechrest & Minick

(57) ABSTRACT

A method and system for efficiently implementing an error correction code scheme. In one embodiment of the present invention, a system comprises a processor configured to process frames of data. Each frame of data may be associated with a frame control block. The processor comprises a first queue configured to store one or more frame control blocks associated with one or more frames of data. The processor further comprises a second queue configured to store one or more frame control blocks not associated with a frame of data. The one or more frame control blocks associated with one or more frames of data in the first queue comprise a bit for storing a parity bit. The one or more frame control blocks in the second queue comprise a plurality of bits for storing a code of an error correction code scheme.

22 Claims, 9 Drawing Sheets

FIG. 3

| 35 34 33 32 31 30 29 28 27 26 25 24 23 22 21 20 19 18 | 17 16 15 14 13 12 11 10 9 8 7 6 5 4 3 2 1 0 |
|---|---|
| NFA 19b | BCNT 16b |
| FBA 21b | PTY | PTY | ABOR | SBP 6b | EBP 6b |

| 35|34|33|32|31|30|29|28|27|26|25|24|23|22|21|20|19|18|17|16|15|14|13|12|11|10|9|8|7|6|5|4|3|2|1|0 |

NBA 21b | PTY / TBUF LB | SBP 6b | EBP 6b

FIG. 8

| 35 34 33 32 31 30 29 28 27 26 25 24 23 22 21 20 19 18 17 16 15 14 13 12 11 10 9 8 7 6 5 4 3 2 1 0 |
|---|

| NBA 21b | LB 1 | ECC 6b |
|---|---|---|

EFFICIENT IMPLEMENTATION OF ERROR CORRECTION CODE SCHEME

CROSS REFERENCE TO RELATED APPLICATIONS

The present invention is related to the following U.S. Patent Applications which are incorporated herein by reference:

Ser. No. 09/792,494 entitled "Assignment of Packet Descriptor Field Positions in a Network Processor" filed Feb. 23, 2001.

Ser. No. 09/792,557 entitled "Storing Frame Modification Information in a Bank in Memory" filed Feb. 23, 2001.

Serial No. 09/791,336 entitled "Linking Frame Data by Inserting Qualifiers in Control Blocks" filed Feb. 23, 2001.

TECHNICAL FIELD

The present invention relates to the field of a networking communication system, and more particularly to implementing an error correction code scheme when the bandwidth of the memory permits and implementing a parity scheme when the bandwidth of the memory does not permit implementing the error correction code scheme.

BACKGROUND INFORMATION

A packet switching network has switching points or nodes for transmission of data among senders and receivers connected to the network. The switching performed by these switching points is in fact the action of passing on packets or "frames" of data received by a switching point or node to a further node in the network. Such switching actions are the means by which communication data is moved through the packet switching network.

Each node may comprise a packet processor configured to process packets or frames of data. The packet processor may comprise a data storage unit, e.g., Double Data Rate Static Random Access Memory (DDR SRAM), configured with a plurality of buffers to store frame data. Each frame of data may be associated with a Frame Control Block (FCB) configured to describe the corresponding frame of data. Each FCB associated with a frame of data may be associated with one or more Buffer Control Blocks (BCBs). Each BCB associated with an FCB may be associated with a buffer in the data storage unit. The BCB associated with an FCB may be configured to describe the associated buffer. Typically, FCBs and BCBs comprise various fields of information where the fields of information in FCBs and BCBs are each supplied by a separate memory, e.g., Quadruple Data Rate Static Random Access Memory (QDR SRAM), in the packet processor. That is, the fields of information in FCBs and BCBs may be obtained by accessing a separate memory, e.g., QDR SRAM, in the packet processor.

Errors may result in writing and/or reading the information in the fields of the control blocks, e.g., FCBs, BCBs. A common method of detecting errors in the fields of control blocks, e.g., FCBs, BCBs, may be to reserve a bit commonly referred to as a parity bit in one of the bits of the control block. The scheme of reserving a parity bit in one of the bits of the control block to indicate errors may be referred to as the parity bit scheme. The parity bit scheme simply detects errors but does not correct errors.

A method of detecting and to some extent correcting errors in the fields of control blocks, e.g., FCBs, BCBs, may be to implement an Error Correction Code (ECC) scheme. The ECC scheme requires the reservation of more bits of information, e.g., 6 bits, in the control blocks than the parity bit scheme, e.g., 1 bit, to store the code of the ECC scheme. However, control blocks, e.g., FCBs, BCBs, may not have enough bits available for storing the ECC scheme.

It would therefore be desirable to implement the ECC scheme when the control blocks, e.g., FCBs, BCBs, comprise enough available bits to store the code of the ECC scheme and implement the parity bit scheme when the control blocks, e.g., FCBs, BCBs, do not comprise enough available bits to store the code of the ECC scheme.

SUMMARY

The problems outlined above may at least in part be solved in some embodiments by implementing the parity bit scheme in the control blocks, e.g., Frame Control Blocks (FCBs), Buffer Control Blocks (BCBs), when the FCBs are associated with frames of data, i.e., when the FCBs do not comprise enough available bits to store the code for the Error Correction Code (ECC) scheme. FCBs that are not associated with a frame of data may store the code for the ECC scheme as there are available bits to store the code for the ECC scheme. BCBs that are not associated with a buffer may store the code for the ECC scheme as there are available bits to store the code for the ECC scheme.

In one embodiment, a system comprises a processor configured to process frames of data. The processor comprises a plurality of buffers configured to store frames of data where each frame of data may be associated with a frame control block. Each frame control block associated with a frame of data may be associated with one or more buffer control blocks. Each buffer control block associated with a frame control block may be associated with a buffer configured to store frame data. The processor may further comprise a first queue configured to store one or more frame control blocks associated with one or more frames of data. The processor may further comprise a second queue configured to store one or more frame control blocks not associated with a frame of data. The processor may further comprise a third queue configured to store one or more buffer control blocks not associated with a particular buffer of the plurality of buffers. The one or more frame control blocks associated with one or more frames of data in the first queue comprise a bit for storing a parity value as there are not available bits for storing the code of the error correction code scheme. Each of the one or more buffer control blocks associated with each of the one or more frame control blocks in the first queue comprises a bit for storing the parity bit as there are not available bits for storing the code of the error correction code scheme. The one or more frame control blocks in the second queue comprise a plurality of bits for storing a code of an error correction code scheme. The one or more buffer control blocks in the third queue comprise a plurality of bits for storing the code of the error correction code scheme.

In another embodiment of the present invention, a method for using a parity bit in a frame control block associated with a frame of data to be transmitted comprises the step of reading the frame control block associated with the frame of data to be transmitted where the frame control block is configured to describe the frame of data. The method further comprises determining whether the parity bit in the frame control block indicated an error. If the parity bit in the frame control block indicated an error then one or more frame control blocks following the frame control block with the parity bit that indicated an error in a first queue may be lost in the processor. In one embodiment, the one or more frame control blocks that are lost in the processor may be located by a background mechanism and returned to a second queue for storage. If the parity bit in the frame control block did not indicate an error, then the first buffer control block associated with the frame control block is read. A determination is made as to whether the parity bit in the first Buffer Control Block (BCB) indicated an error. If the parity bit in the first BCB indicated an error, then the one or more BCBs following the first BCB may be lost in the processor. In one embodiment, the one or more BCBs that are lost in the processor may be located by a background mechanism and returned to a third queue for storage. If the parity bit in the first BCB did not indicate an error, then a determination is made as to whether the first BCB was the last BCB associated with the frame control block. If the first BCB is the last BCB then a next frame control block may be read associated with a next frame of data to be transmitted. If the first BCB is not the last BCB associated with the frame control block, then a next BCB may be read. The above steps involving the first BCB may be repeated with the next BCB.

For example, a determination may be made as to whether the parity bit in the next BCB indicated an error. If the parity bit in the next BCB indicated an error, then the one or more BCBs following the next BCB may be lost in the processor. In one embodiment, the one or more BCBs that are lost in the processor may be located by a background mechanism and returned to a third queue for storage. If the parity bit in the next BCB did not indicate an error, then a determination may be made as to whether the next BCB was the last BCB associated with the frame control block. If the next BCB is the last BCB then a next frame control block may be read associated with a next frame of data to be transmitted. If the next BCB is not the last BCB associated with the frame control block, then the BCB following the next BCB may be read. The above steps may be repeated for each of the BCBs following the next BCB.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 3 illustrates an embodiment of the present invention of a frame control block with a parity bit scheme.

FIG. 6 illustrates an embodiment of the present invention of a buffer control block with a parity bit scheme.

FIG. 8 illustrates an embodiment of the present invention of a buffer control block with an error correction code scheme.

DETAILED DESCRIPTION

The present invention comprises a method and system for efficiently implementing an error correction code scheme. In one embodiment of the present invention, a system comprises a processor configured to process frames of data. Each frame of data may be associated with a frame control block. Each frame control block may be associated with one or more buffer control blocks. Each buffer control block associated with a frame control block may be associated with a buffer configured to store frame data. The processor may comprise a first queue configured to store one or more frame control blocks associated with one or more frames of data. The processor may further comprise a second queue configured to store one or more frame control blocks not associated with a frame of data. The processor may further comprise a third queue configured to store one or more buffer control blocks not associated with a particular buffer of the plurality of buffers. The one or more frame control blocks associated with one or more frames of data in the first queue comprise a bit for storing a parity value as there are not available bits for storing the code of the error correction code scheme. Each of the one or more buffer control blocks associated with each of the one or more frame control blocks in the first queue comprises a bit for storing the parity value as there are not available bits for storing the code of the error correction code scheme. The one or more frame control blocks in the second queue comprise a plurality of bits for storing a code of an error correction code scheme. The one or more buffer control blocks in the third queue comprise a plurality of bits for storing the code of the error correction code scheme.

Figure 1:
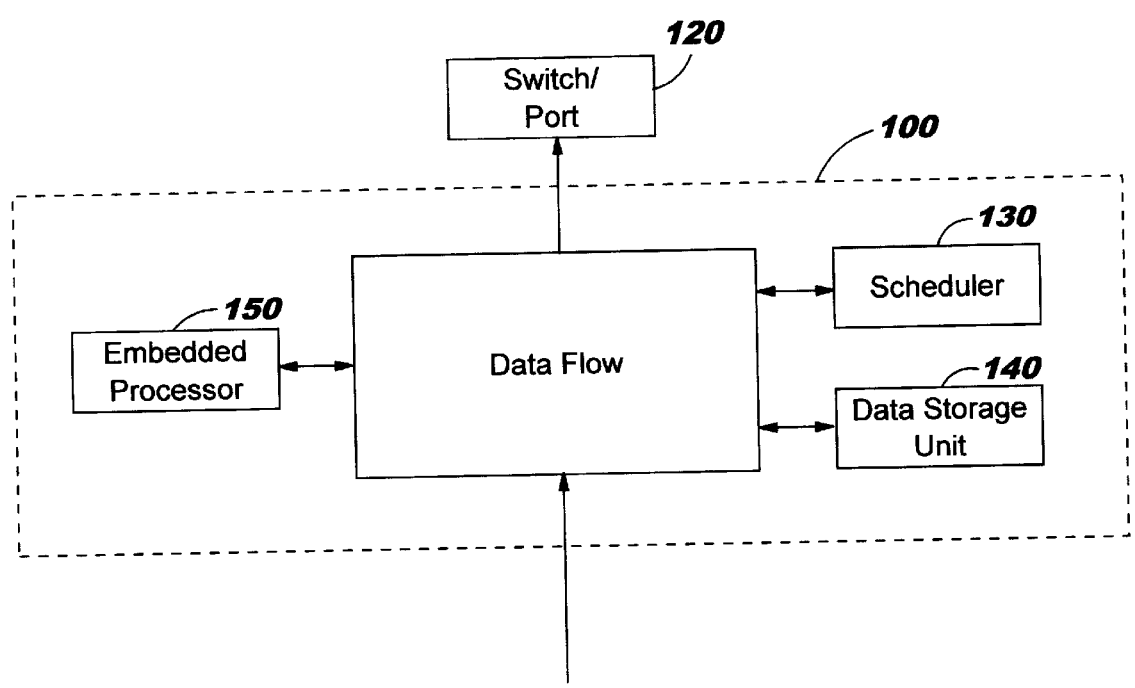
FIG. 1 illustrates a packet processor configured in accordance with the present invention.

FIG. 1—Packet Processor

FIG. 1 illustrates an embodiment of the present invention of a packet processor 100. Packet processor 100 may comprise a data flow unit 110 configured to receive digital packets, i.e., frames, of data, from a particular switch (not shown) or port (not shown) of a packet switching network and transmit the digital packets, i.e., frames, of data to another switch or port, e.g., switch/port 120, in the packet switching network. Each frame of data may be associated with a Frame Control Block (FCB) where the FCB describes the associated frame of data. Each FCB associated with a frame of data may be associated with one or more Buffer Control Blocks (BCBs) where each BCB associated with an FCB may be associated with a buffer in a data storage unit 140. A BCB may be configured to describe the buffer associated with the next chained BCB as described in U.S. application Ser. No. 09/791,336, filed on Feb. 23, 2001 entitled "Linking Frame Data by Inserting Qualifiers in Control Blocks," which is hereby incorporated herein by reference in its entirety. In one embodiment, data flow unit 110 may reside on an integrated circuit, i.e., integrated chip. Data flow unit 110 may be coupled to data storage unit 140 configured to temporarily store frames of data received by data flow unit 110 from a switch (not shown) or port (not shown) in the packet switching network. Data flow unit 110 may further be coupled to a scheduler 130 configured to schedule frames of data to be transmitted from data flow unit 110 to switch/port 120. In one embodiment, scheduler 130 may reside on an integrated circuit, i.e., integrated chip. Furthermore, data flow unit 110 may further be coupled to an embedded processor 150 configured to process frames of data received by data flow unit 110.

Figure 2:
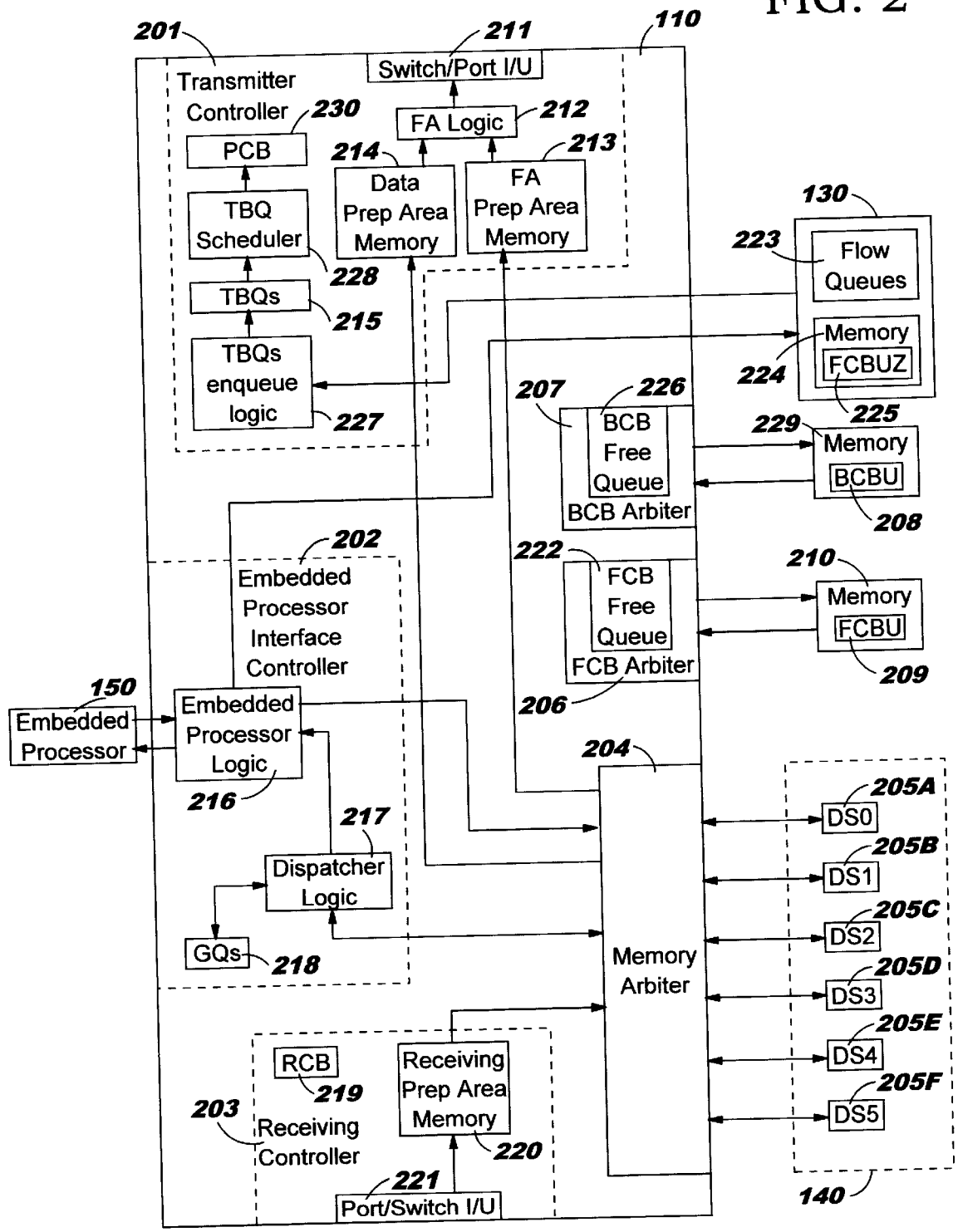
FIG. 2 illustrates a data flow unit configured in accordance with the present invention.

FIG. 2—Data Flow Unit

FIG. 2 illustrates an embodiment of the present invention of data flow unit 110. Data flow unit 110 may comprise a receiver controller 203 configured to receive and temporarily store packets, i.e., frames, of data received from a switch (not shown) or port (not shown) in a packet switching network. Data flow unit 110 may further comprise a transmitter controller 201 configured to modify the frame data as well as transmit the modified frame data to a switch (not shown) or port (not shown) in a packet switching network. Data flow unit 110 may further comprise an embedded processor interface controller 202 configured to exchange frames to be processed by embedded processor 150.

Packets, i.e., frames, of data may be received by a port/switch interface unit 221. Port/switch interface unit 221 may receive data from a switch (not shown) in the packet switching network when data flow unit 110 operates in an egress mode. Otherwise, port/switch interface unit 221 may receive data from a port (not shown) that operates as an interface to the packet switching network when data flow unit 110 operates in an ingress mode. Data received by data flow unit 110 may be temporarily stored in a receiving preparation area memory 220 prior to being stored in data storage unit 140 which may be represented by a plurality of slices 205A–F. Slices 205A–F may collectively or individually be referred to as slices 205 or slice 205, respectively. The number of slices 205 in FIG. 2 is illustrative, and an embodiment of data flow unit 110 in accordance with the principles of the present invention may have other predetermined number of slices 205. Each slice may comprise a plurality of buffers. Each slice may represent a slice of memory, e.g., Dynamic Random Access Memory (DRAM), so that frame data may be written into different buffers in different slices in order to maximize memory bandwidth. A memory arbiter 204 may be configured to collect requests, e.g., read, write, from receiver controller 203, transmitter controller 201 and embedded processor interface controller 202 and subsequently schedule access to particular data store memory slices, i.e., particular buffers in particular slices 205. For example, receiver controller 203 may be configured to issue write requests to memory arbiter 204 in order to write received data into individual buffers in a particular slice 205.

As stated above, frame data may be stored in data storage unit 140, i.e., a plurality of slices 205. In one embodiment, frame data may be stored in one or more buffers in one or more slices 205 in a manner such that the data in each particular frame may be recomposed by having the buffers chained together. That is, data in a particular frame may be stored in one or more buffers that are chained together in the order that data is written into the one or more buffers. The chaining of the one or more buffers may be controlled by a Buffer Control Block Unit (BCBU) 208 in a memory 229, e.g., Quadruple Data Rate Static Random Access Memory (QDR SRAM), coupled to data flow unit 110. BCBU 208 may be configured to comprise the addresses of each of the one or more buffers chained together in the order data was written into buffers. The different buffers comprising data of the same frames may be linked together by means of pointers stored in BCBU 208.

As stated above, each frame of data may be associated with a Frame Control Block (FCB) where the FCB describes the associated frame of data. Frame Control Block Unit 1 (FCBU1) 209 in a memory 210, e.g., QDR SRAM. may be configured to store the information, e.g., frame control information, to be filled in the fields of the FCBs. That is, the fields of information in FCBs may be obtained by accessing memory 210, i.e., FCBU1 209 of memory 210. Additional details regarding FCBU1 209 of memory 210 storing fields of information are disclosed in U.S. patent application Ser. No. 09/792,494 filed on Feb. 23, 2001, entitled "Assignment of Packet Descriptor Field Positions in a Network Processor," which is hereby incorporated herein by reference in its entirety.

Frame data stored in buffers may be processed by embedded processor 150 by transmitting the header of each frame to be processed to embedded processor 150. As stated above, each frame of data may be represented by an FCB. These FCBs may be temporarily stored in G Queues (GQs) 218. Dispatcher logic 217 may be configured to dequeue the next FCB from GQs 218. Once dispatcher logic 217 dequeues the next FCB, dispatcher logic 217 issues a read request to memory arbiter 204 to read the data at the beginning of the frame, i.e., header of the frame, stored in data storage unit 140 associated with the dequeued FCB. The data read by dispatcher logic 217 is then processed by embedded processor 150.

Once frame data has been processed by embedded processor 150, the processed frame data may be temporarily stored in data storage unit 140, i.e., slices 205, by embedded processor logic 216 issuing a write request to memory arbiter 204 to write the processed frame data into individual buffers in one or more slices 205.

Once frame data has been processed by embedded processor 150, embedded processor logic 216 further issues the FCB associated with the processed frame to scheduler 130. Scheduler 130 may be configured to comprise flow queues 223 configured to store FCBs. Scheduler 130 may further comprise a Frame Control Block Unit 2 (FCBU2) 225 within a memory 224, e.g., QDR SRAM, configured to operate similarly as FCBU1 209. FCBU2 225 may be configured to store the information to be filled in the fields of the FCBs when the FCBs are temporarily residing in flow queues 223. Additional details regarding FCBU2 225 within memory 224 of scheduler 130 storing fields of information are disclosed in U.S. patent application Ser. No. 09/792,494, filed on Feb, 23, 2001, entitled "Assignment of Packet Descriptor Field Positions in a Network Processor". Scheduler 130 may be configured to transmit the FCBs stored in flow queues 223 to Target Blade Queues (TBQs) 215 enqueue logic 227 configured to enqueue the received FCBs in TBQs 215.

FCBs queued in TBQs 215 may be scheduled to be dequeued from TBQs 215 by TBQ scheduler 228 and loaded into Port Control Block (PCB) 230. TBQ scheduler 228 may be configured to dequeue the next FCB from TBQs 215 and transfer that FCB to PCB 230. Once the next FCB is transferred to PCB 230, PCB 230 may issue a read request to memory arbiter 204 to read the data at the beginning of the frame, i.e., header of the frame, stored in data storage unit 140 associated with the dequeued FCB. The data read by PCB 230 may be temporarily stored in data preparation area memory 214 prior to transmitting the processed frame data to a switch (not shown) or port (not shown) in a packet switching network. It is noted for clarity that PCB 230 may be configured to read a portion of the data stored in the processed frame in each particular read request. That is, the entire data stored in the processed frame may be read in multiple read requests provided by PCB 230. Once the entire data stored in the processed frame is read, the data storage unit 140 may store additional frame data.

Transmitter controller 201 may further comprise a frame alteration preparation area memory 213 configured to receive commands to modify the processed frames temporarily stored in data preparation area memory 214. These commands are commonly referred to as frame modification commands which are issued by embedded processor 150 and stored in a particular bank in a particular buffer by embedded processor logic 216. Additional details regarding the storing of frame modification commands in a particular bank in a particular buffer are disclosed in U.S. patent application Ser. No. 09/792,557, filed on Feb. 23, 2001, entitled "Storing Frame Modification Information in a Bank in Memory," which is hereby incorporated herein by reference in its entirety. In one embodiment, PCB 230 may be configured to retrieve the frame modification commands stored in a particular bank in a particular buffer and store them in frame alteration preparation area memory 213. A Frame Alteration (FA) logic unit 212 may be configured to execute the commands stored in frame alteration preparation area memory 213 to modify the contents of the processed frames temporarily stored in data preparation area memory 214. Once FA logic 212 has modified the contents of the processed frames, then modified processed frames may be transmitted through a switch/port interface unit 211. Switch/port interface unit 211 may transmit data to a port (not shown) that operates as an interface to the packet switching network when data flow unit 110 operates in an egress mode. Otherwise, switch/port interface unit 211 may transmit data to a switch (not shown) in the packet switching network when data flow unit 110 operates in an ingress mode.

Data flow unit 110 may further comprise a Buffer Control Block (BCB) Arbiter 207 configured to arbitrate among different BCB requests from transmitter controller 201, embedded processor interface controller 202 and receiver controller 203 to read from or write to BCBU 208. BCB Arbiter 207 may be configured to schedule different accesses in order to utilize memory bandwidth as efficiently as possible. Data flow unit 110 may further comprise a Frame Control Block (FCB) Arbiter 206 configured to arbitrate among different FCB requests from embedded processor interface controller 202, receiver controller 203 and transmitter controller 201 to read from or write to FCBU1 209.

As stated above, each frame of data may be associated with an FCB. As the processed frames are read from data storage unit 140, e.g., DDR DRAM, and the processed frames are modified and transmitted to a switch (not shown) or a port (not shown) in the packet switching network, the FCB associated with such processed frame ceases to represent that particular frame of data. Once the FCB is no longer associated with frame data, the FCB may be stored in a FCB free queue 222 within FCB Arbiter 206. FCB free queue 222 may be configured to comprise a plurality of FCBs that are no longer associated with particular frame data. It is noted that FCB free queue 222 may comprise any number of FCBs that are no longer associated with particular frame data. Once data flow unit 110 receives a packet, i.e., frame, of data, a Reassembly Control Block (RCB) 219 of receiver controller 203 may associate a particular FCB from FCB free queue 222 with the received frame of data where the newly associated FCB may then be queued in GQs 218 by RCB 219.

As stated above, each frame of data may be associated with an FCB. Each FCB associated with a frame of data may be associated with one or more BCBs where each BCB associated with an FCB may be associated with a particular buffer of data storage 140. A BCB may be configured to the describe the buffer associated with the next BCB. Once the processed frame data stored in a buffer of data storage unit 140 has been retrieved by transmitter controller 201 and subsequently modified and transmitted to a switch (not shown) or port (not shown) in the packet switching network, the BCB associated with that particular buffer that no longer includes any frame data ceases to comprise any valid information. That is, the BCB associated with the particular buffer that no longer includes any frame data includes data that is not useful since the particular buffer associated with the BCB no longer includes any frame data. Once the BCB ceases to comprise any valid information, i.e., once the frame data in a particular buffer has been transmitted, the BCB may be stored in a BCB free queue 226 within BCB Arbiter 206. BCB free queue 226 may be configured to comprise a plurality of BCBs that do not comprise any valid information. It is noted that BCB free queue 226 may comprise any number of BCBs that do not comprise any valid information. Once receiver controller 203 writes received frame data in a particular buffer of data storage unit 140, RCB 219 of receiver controller 203 may write valid information in the particular BCB in BCB free queue 226 that is associated with the particular buffer that stored the received frame of data.

As stated above, an FCB may temporarily reside in FCB free queue 222 or may temporarily reside in one of the other queues, e.g., GQs 218, flow queues 223, TBQs 215. A more detailed description of the "life cycle" of the FCB where an FCB may be initially stored in FCB free queue 222 and transferred through queues, e.g., GQs 218, flow queues 223, TBQs 215, until being enqueued in FCB free queue 222 is provided in U.S. patent application Ser. No. 09/792,494 filed on Feb. 23, 2001, entitled "Assignment of Packet Descriptor Field Positions in a Network Processor".

Figure 5:
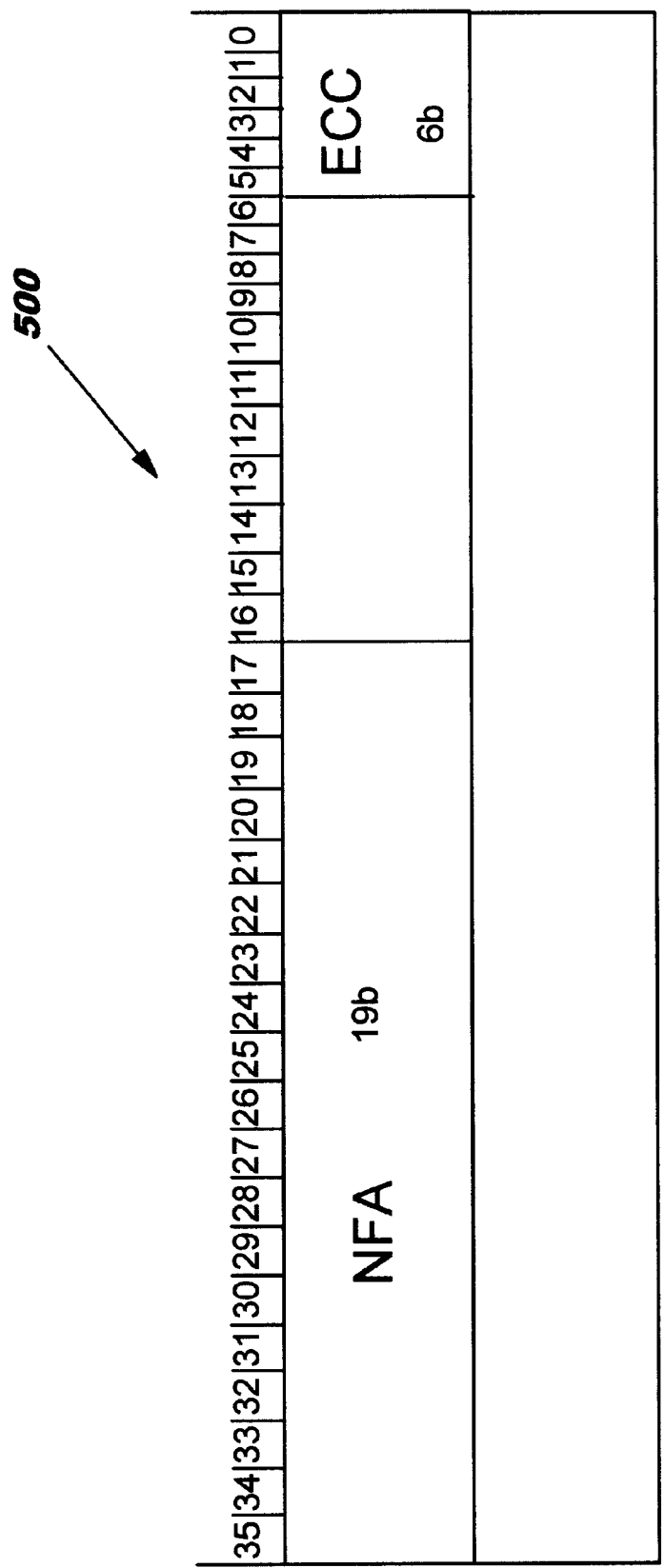
FIG. 5 illustrates an embodiment of the present invention of a frame control block with an error correction code scheme.

As stated in the Background Information section, errors may result in writing and/or reading the information in the fields of the control blocks, e.g., FCBs, BCBs. A method of detecting errors in the fields of control blocks, e.g., FCBs, BCBs, may be to reserve a bit commonly referred to as a parity bit in the control block that may indicate an error from writing and/or reading information in the fields of the control block. The scheme of reserving a parity bit in one of the bits of the control block to indicate errors may be referred to as the parity bit scheme. Unfortunately, the parity bit scheme simply detects errors but does not correct errors. A method of detecting and to some extent correcting errors in the fields of control blocks, e.g, FCBs, BCBs, may be to implement an Error Correction Code (ECC) scheme. The ECC scheme may require the reservation of more bits, e.g., 6 bits, in the control block than the parity bit scheme, e.g., 1 bit, to store the code of the ECC scheme. However, control blocks, e.g., FCBs, BCBs, may not have enough bits available for storing the code of the ECC scheme. It would therefore be desirable to efficiently implement the ECC scheme when the control blocks, e.g., FCBs, BCBs, comprise enough available bits to store the code of the ECC scheme and implement the parity bit scheme when the control blocks, e.g., FCBs, BCBs, do not comprise enough available bits to store the code of the ECC scheme. FCBs residing in queues, e.g., GQs 218, flow queues 223, TBQs 215, of data flow unit 110, may not comprise enough storage bits to store the code of the ECC scheme and therefore reserve a bit, i.e., parity bit, for indicating an error in writing and/or reading information in the fields of the FCBs as illustrated in FIG. 3. FCBs residing in FCB free queue 222 may comprise enough storage bits to store the code of the ECC scheme and therefore store the code of the ECC scheme as illustrated in FIG. 5. FCBs residing in FCB free queue 222 may comprise enough storage bits to store the code of the ECC scheme because the FCBs in FCB free queue 222 are not associated with a frame of data and therefore do not need to store certain fields of information, e.g., byte count length of the one or more BCBs associated with the FCB. The one or more BCBs associated with each of the FCBs not residing in FCB free queue 222 may not comprise enough storage bits to store the code of the ECC scheme and therefore reserve a bit, i.e., parity bit, for indicating an error in writing and/or reading information in the fields of the BCBs as illustrated in FIG. 6. BCBs residing in BCB free queue 226 may comprise enough storage bits to store the code of the ECC scheme and therefore store the code of the ECC scheme as illustrated in FIG. 8. BCBs residing in BCB free queue 226 may comprise enough storage bits to store the code of the ECC scheme because the buffers associated with the BCBs in BCB free queue 226 may not comprise any frame data and therefore the BCBs in BCB free queue 226 may not need to store certain fields of information, e.g., starting and ending byte position of the buffer associated with the BCB.

FIG. 3—FCB with Parity Bit Protection

FIG. 3 illustrates an embodiment of the present invention of an FCB 300 in queues, e.g., GQs 218, flow queues 223, TBQs 215, of data flow unit 110 comprising two entries or rows where each entry is thirty-six bits. It is noted that FCB 300 in queues, e.g., GQs 218, flow queues 223, TBQs 215, may comprise any number of entries and fields and that FIG. 3 is illustrative.

Referring to FIG. 3, FCB 300 may comprise two fields, e.g., Next FCB Address (NFA), Byte Count length (BCNT), and a Parity bit (PTY) in the first entry. The NFA field may point to the next FCB address in the queue, e.g., GQs 218, flow queues 223, TBQs 215, currently storing FCB 300 thereby allowing the chaining of FCBs in the queue, e.g., GQs 218, flow queues 223, TBQs 215. The BCNT field may comprise the byte count length of the one or more BCBs associated with FCB 300. FCB 300 may comprise three fields, e.g., First BCB Address (FBA), Starting Byte Position (SBP) of the buffer associated with the first BCB associated with FCB 300, Ending Byte Position (EBP) of the buffer associated with the first BCB associated with FCB 300, as well as a Parity bit (PTY), an FCB Type bit (FTO) and an Abort bit (ABOR) in the second entry. The FTO bit may comprise the type of FCB 300. The ABOR bit may indicate that the frame data associated with the FCB has encountered an exception condition and that the FCB should not be considered valid. The parity bit in both the first and second entry of FCB 300 may be used to indicate any errors in writing and/or reading information in the first and second entries of FCB 300. FCB 300 uses a parity bit scheme instead of the ECC scheme as there are not enough bits available to store the code for the ECC scheme. It is noted that FCB 300 may comprise different fields in different queues, e.g., GQs 218, flow queues 223, TBQs 215, as discussed in U.S. patent application Ser. No. 09/792,494, filed on Feb. 23, 2001, entitled "Assignment of Packet Descriptor Field Positions in a Network Processor". It is further noted that even though FCB 300 may comprise different fields in different queues, e.g., GQs 218, flow queues 223, TBQs 215, FCB 300 does not comprise enough bits available to store the code for the ECC scheme. It is further noted that additional details regarding the fields of FCB 300 are discussed in U.S. patent application Ser. No. 09/791,336, filed on Feb. 23, 2001, entitled "Linking Frame Data by Inserting Qualifiers in Control Blocks".

Figure 4:
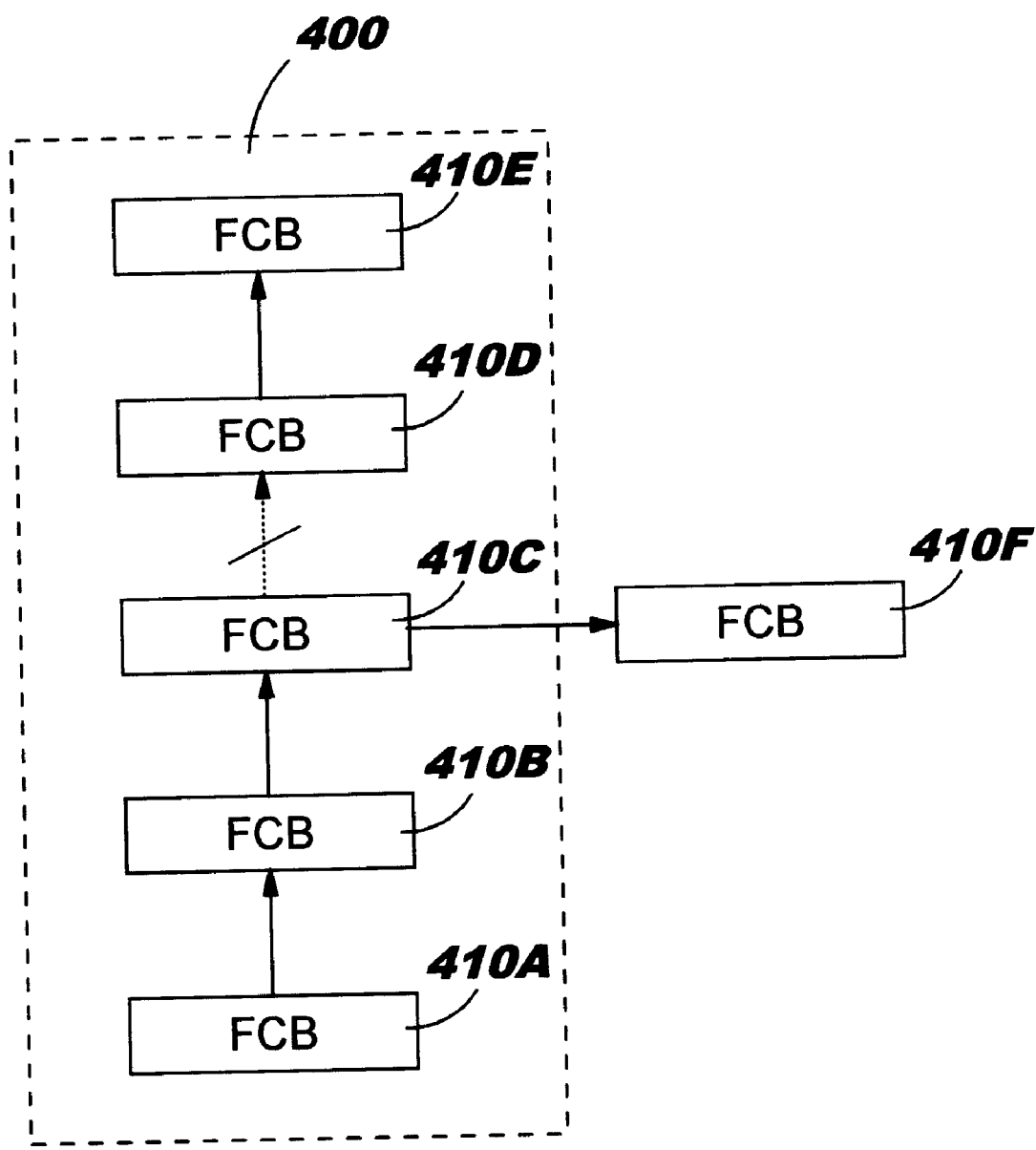
FIG. 4 illustrates the breaking of a chain of frame control blocks in a queue in the data flow unit.

Because FCB 300 may not comprise enough bits available to store the code for the ECC scheme, an error indicated by one of the parity bits in FCB 300 may result in the chaining of the FCBs in the queue, e.g., GQs 218, flow queues 223, TBQs 215, comprising FCB 300, being broken as illustrated in FIG. 4. FIG. 4 illustrates an embodiment of the present invention of a queue 400, e.g., GQs 218, flow queues 223, TBQs 215, comprising a plurality of chained FCBs 410A–E. FCB 410F may refer to an FCB located in a separate queue, e.g., GQs 218, flow queues 223, TBQs 215, FCB free queue 222. FCBs 410A–F may collectively or individually be referred to as FCBs 410 or FCB 410, respectively. Each FCB 410 may comprise identical entries and fields as FCB 300.

Referring to FIG. 4, a parity bit in the first entry of FCB 410C may indicate an error in the writing and/or reading the information in the fields of FCB 410C. Since the parity bit scheme simply indicates and does not correct any errors, the NFA field in FCB 410C, for example, may not point to the next FCB in queue 400 but instead point to an FCB located outside queue 400, FCB 410F in the illustrative case in FIG. 4. FCB 410C may point to an FCB 410F located outside queue 400 because the chain between FCB 410C and FCB 410D is broken. The chain between FCB 410C and FCB 401D may be broken because the NFA field in FCB 410C is not guaranteed to be accurate. FCBs, e.g., FCBs 410D–E, following FCB 410C may then be lost as the chaining of FCBs between FCB 410C and FCBs 410D–E is broken as indicated by the dashed arrow with a slash through it. If FCB 410C comprised enough fields to store the code of the ECC scheme then the error may be corrected and the chaining of the FCBs may not be broker. FCBs in FCB free queue 222 comprise enough available bits to store the code of the ECC scheme which may prevent the chaining of the FCBs from being broken as discussed below. It is noted that since FCB free queue 222 may typically comprise a significant number of FCBs greater than the FCBs stored in the other queues, e.g., GQs 218, flow queues 223, TBQs 215, of data flow unit 110, that preventing the breaking of the chain of FCBs in FCB free queue 222 is more important than preventing the breaking of the chain of FCBs in other queues, e.g., GQs 218, flow queues 223, TBQs 215, of data flow unit 110. FCB free queue 222 may be configured to have the capacity of storing the full number of FCBs supported by packet processor 100.

FIG. 5—FCB with ECC Protection

FIG. 5 illustrates an embodiment of the present invention of an FCB 500 in FCB free queue 222 comprising two entries or rows where each entry is thirty-six bits. It is noted that FCB 500 in FCB free queue 222 may comprise any number of entries and fields and that FIG. 5 is illustrative.

Referring to FIG. 5, FCB 500 may comprise two fields, e.g., Next FCB Address (NFA), Error Correction Code (ECC), in the first entry. The NFA field may point to the next FCB address in FCB free queue 222 thereby allowing the chaining of the FCBs in FCB free queue 222. The ECC field may comprise the code for the ECC scheme. As illustrated in FIG. 5, FCB 500 may comprise enough bits to store the code for the ECC scheme. As stated above, FCBs residing in FCB free queue 222 may comprise enough storage bits to store the code of the ECC scheme because the FCBs in FCB free queue 222 are not associated with a frame of data and therefore do not need to store certain fields of information, e.g., byte count length of the one or more BCBs associated with the FCB. By storing the code for the ECC scheme, errors may be detected in writing and/or reading information in the fields of FCB 500 and corrected within the limits associated with the implementation of the ECC used in the embodiment of the present invention. Thus, the breaking of the chains of FCBs as illustrated in FIG. 4 may be prevented in FCB free queue 222.

It is noted that additional details regarding the fields of FCB 500 are discussed in U.S. patent application Ser. No. 09/792,494, filed on Feb. 23, 2001, entitled "Assignment of Packet Descriptor Field Positions in a Network Processor".

FIG. 6—BCB with Parity Bit Protection

FIG. 6 illustrates an embodiment of the present invention of a BCB 600 that is associated with an FCB temporarily residing in one of the queues, e.g., GQs 218, flow queues 223, TBQs 215, of data flow unit 10 other than FCB free queue 222. BCB 600 may comprise an entry or row with a length of thirty-six bits. It is noted that BCB 600 may comprise any number of entries and fields and that FIG. 6 is illustrative.

Referring to FIG. 6, BCB 600 may comprise three fields, e.g., Next BCB Address (NBA), Starting Byte Position (SBP) of the frame data stored in the buffer associated with the next BCB, Ending Byte Position (EBP) of the frame data stored in the buffer associated with the next BCB, as well as a Parity bit (PTY), an indicator (TBUF) as to whether the buffer associated with BCB 600 will be released or maintained in data storage unit 140, and a Last Buffer indication (LB). Additional details regarding the fields of BCB 600 are discussed in U.S. patent application Ser. No. 09/791,336, filed on Feb. 23, 2001, entitled "Linking Frame Data by Inserting Qualifiers in Control Blocks". The NBA field may point to the next BCB address associated with an FCB. As stated above, each FCB that is associated with a frame of data may be associated with one or more BCBs where each BCB associated with an FCB may be associated with a particular buffer of data storage unit 140. Additional details regarding the association between FCBs and BCBs as well as between BCBs and buffers 205 of data storage unit 140 are discussed in U.S. patent application Ser. No. 09/791,336, filed on Feb. 23, 2001, entitled "Linking Frame Data by Inserting Qualifiers in Control Blocks". The SBP field may store the starting byte position of the frame data stored in the buffer associated with the next BCB. The EBP field may store the ending byte position of the frame data stored in the buffer associated with the next BCB. The TBUF indicator may indicate as to whether the BCB 600 associated with the frame data transmitted will be released to BCB free queue 226 or not. Details regarding the LB indicator are discussed in U.S. patent application Ser. No. 09/828,342, filed on Apr. 6, 2001, entitled "Method for Efficient Indication of Last Data Buffer of a Packet in a Network Processor," which is hereby incorporated herein by reference in its entirety. The parity bit in of BCB 600 may be used to indicate any errors in writing and/or reading information in the entry of BCB 600. BCB 600 uses a parity bit scheme instead of the ECC scheme as there may not be enough bits available to store the code for the ECC scheme.

Figure 7:
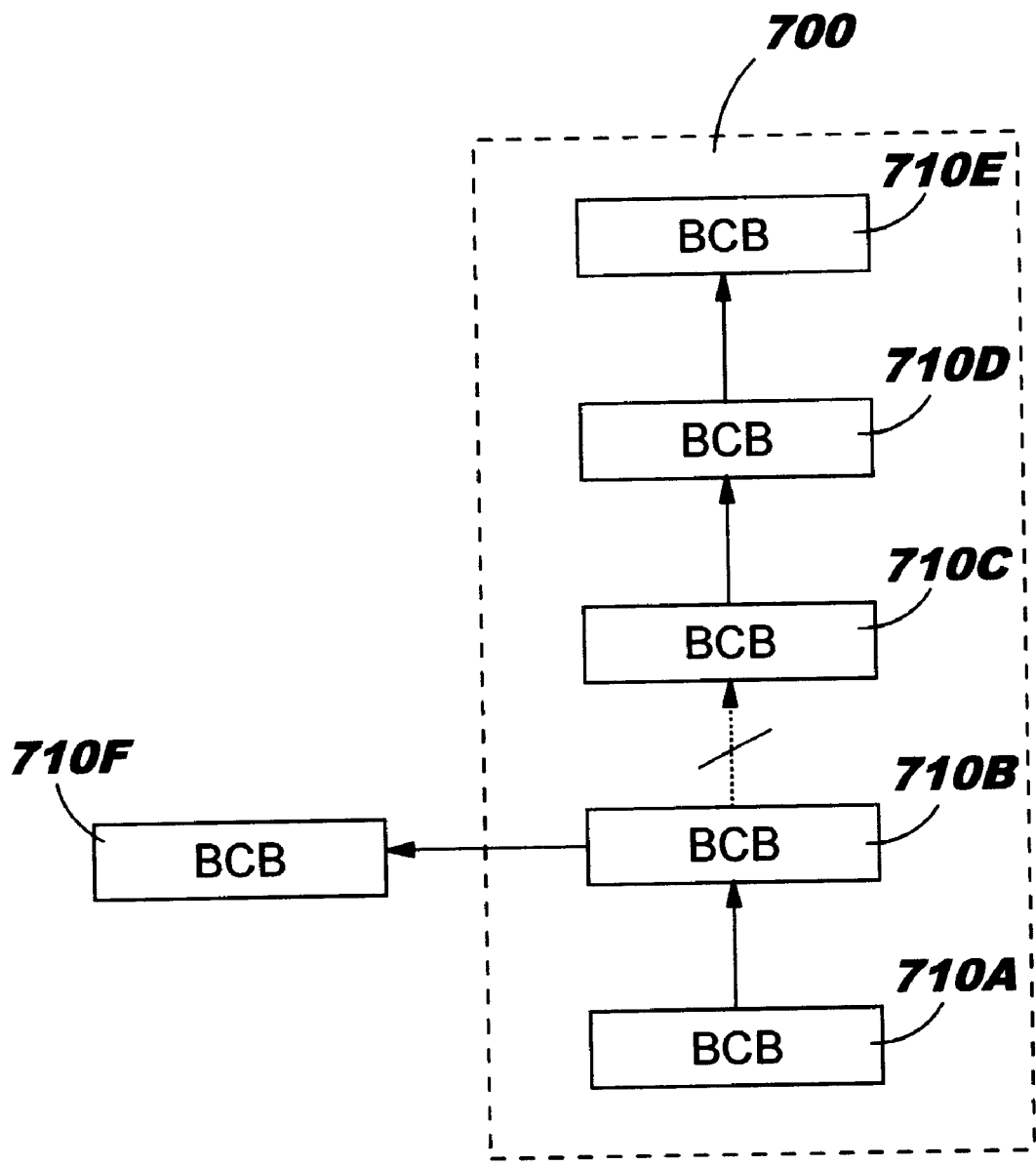
FIG. 7 illustrates the breaking of a chain of buffer control blocks in a frame.

Because BCB 600 may not comprise enough bits available to store the code for the ECC scheme, an error indicated by a parity bit in BCB 600 may result in the chaining of the BCBs associated with an FCB being broken as illustrated in FIG. 7. FIG. 7 illustrates an embodiment of the present invention of a frame 700 comprising a plurality of BCBs 710A–E associated with an FCB, i.e., a frame of data. It is noted that frame 700 may comprise one or more BCBs that are associated with an FCB and that FIG. 7 is illustrative. BCB 710F refers to a BCB located outside frame 700, e.g., located in a separate frame. BCBs 710A–F may collectively or individually be referred to as BCBs 710 or BCB 710, respectively. Each BCB 710 may comprise identical entries and fields as BCB 600.

Referring to FIG. 7, a parity bit in BCB 710B may indicate an error in the writing and/or reading the information in the fields of BCB 710B. Since the parity bit scheme simply indicates and does not correct any errors, the NBA field in BCB 710B, for example, may not point to the next BCB in frame 700 but instead point to a BCB located outside frame 700, BCB 710F in the illustrative case in FIG. 7. BCB 710B may point to a BCB 710F located outside frame 700 because the chain between BCB 710B and BCB 710C is broken. The chain between BCB 710B and BCB 710C may be broken because the NBA field in BCB 410B is not guaranteed to be accurate. BCBs, e.g., BCBs 710C–E, following BCB 710B may then be lost as the chaining of BCBs between BCB 710B and BCBs 710C–E is broken as indicated by the dashed arrow with a slash through it. If BCB 710B comprised enough fields to store the code of the ECC scheme, then the error may be corrected and the chaining of the BCBs may not be broken. BCBs in BCB free queue 226 may comprise enough available bits to store the code of the ECC scheme which may prevent the chaining of the BCBs from being broken as discussed below. It is noted that since BCB free queue 226 may typically comprise a significant number of BCBs greater than the BCBs in a frame that preventing the breaking of the chain of BCBs in BCB free queue 226 is more important than preventing the breaking of the chain of BCBs in a frame. BCB free queue 226 may be configured to have the capacity of storing the full number of BCBs supported by packet processor 100.

FIG. 8—BCB with ECC Protection

FIG. 8 illustrates an embodiment of the present invention of a BCB 800 in BCB free queue 226 comprising an entry or row with a length of thirty-six bits. It is noted that BCB 800 in BCB free queue 226 may comprise any number of entries and fields and that FIG. 8 is illustrative.

Referring to FIG. 8, BCB 800 may comprise two fields, e.g., Next BCB Address (NBA), Error Correction Code (ECC), and a Last Buffer indication (LB). The Details regarding the LB indicator are discussed in U.S. patent application Ser. No. 09/828,342, filed on Apr. 6, 2001, entitled "Method for Efficient Indication of Last Data Buffer of a Packet in a Network Processor". The NBA field may point to the next BCB address in BCB free queue 226 thereby allowing the chaining of the BCBs in BCB free queue 226. The ECC field may comprise the code for the ECC scheme. As illustrated in FIG. 8, BCB 800 may comprise enough bits to store the code for the ECC scheme. As stated above, BCBs residing in BCB free queue 226 may comprise enough storage bits to store the code of the ECC scheme because the buffers associated with the BCBs in BCB free queue 226 may not comprise any frame data and therefore the BCBs in BCB free queue 226 may not need to store certain fields of information, e.g., starting and ending byte position of the buffer associated with the BCB. By storing the code for the ECC scheme, errors may be detected in writing and/or reading information in the fields of BCB 800 and corrected within the limits associated with the implementation of the ECC used in the embodiment of the present invention. Thus, the breaking of the chains of BCBs as illustrated in FIG. 7 may be prevented in BCB free queue 226.

Figure 9:
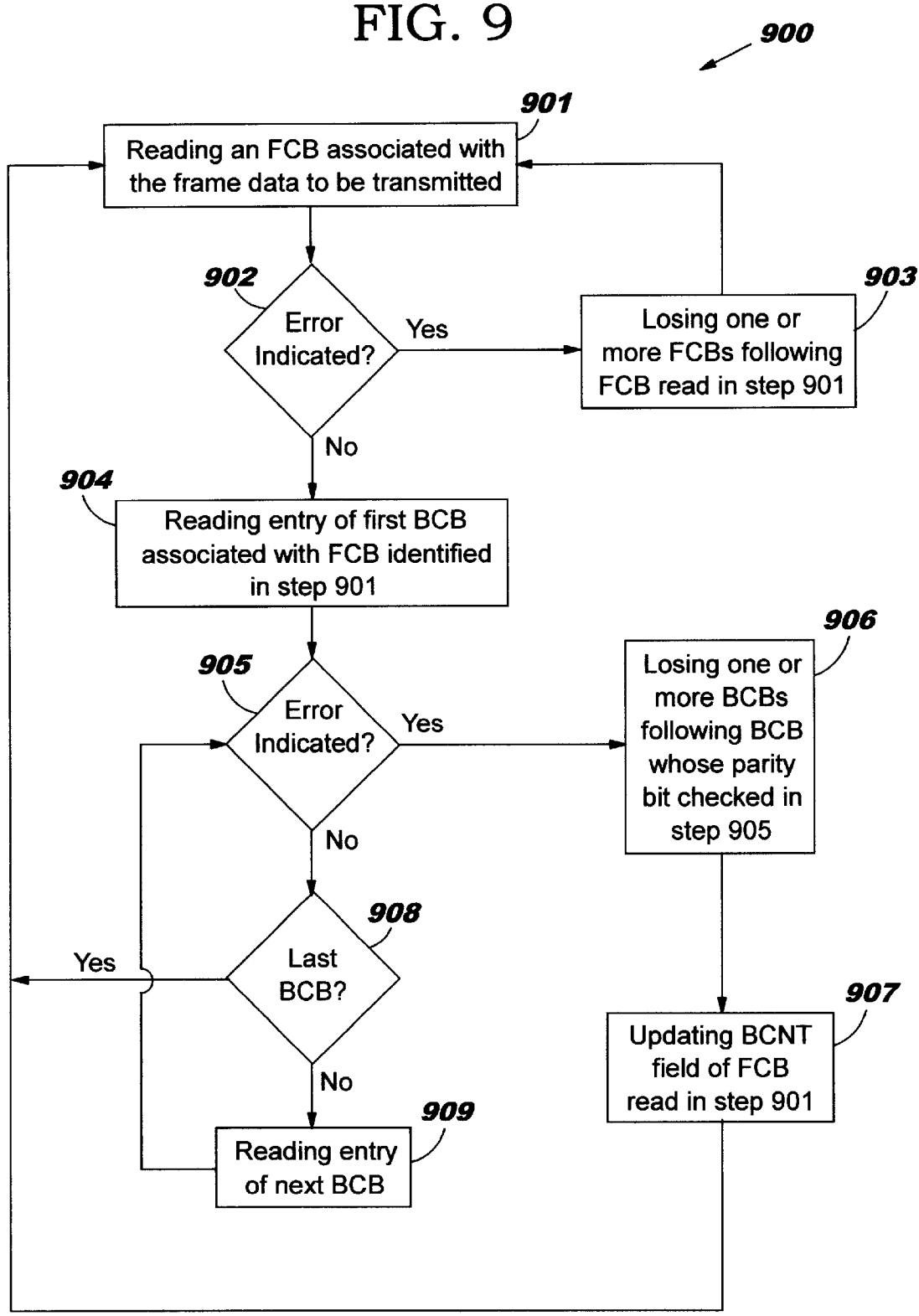
FIG. 9 is a flow diagram illustrating the use of the parity bit in the frame control block associated with the frame data to be transmitted as well as the use of the parity bit in the one or more buffer control blocks associated with the frame control block.

FIG. 9—Flow Diagram

FIG. 9 illustrates an embodiment of the present invention of a flow diagram 900 illustrating the use of the parity bit in the FCB, e.g., FCB 300, associated with frame data to be transmitted by transmitter controller 201 as well as the use of the parity bit in the one or more BCBs, e.g., BCB 600, associated with the FCB, e.g., FCB 300.

In step 901, an FCB in TBQs 215, e.g., FCB 300, associated with the frame data to be transmitted by transmitter controller 201 as discussed in the description of FIG. 2, is read by PCB 224. In step 902, a determination is made as to whether the parity bit in the FCB, e.g., FCB 300, read in step 901, indicated an error in the writing and/or reading of the information in the fields of the FCB. In one embodiment, an error may be indicated by the parity bit based on the state of the value of the parity bit. In an even parity system, the parity bit may have the value of 1 when there is an even number of 1 bits in the data, e.g., NFA field. In the even parity system, the parity bit may have the value of 0 when there is an odd number of 1 bits in the data, e.g., NFA field. In an odd parity system, the parity bit may have the value of 1 when there is an odd number of 1 bits in the data, e.g., NFA field. In the odd parity system, the parity bit may have the value of 0 when there is an even number of 1 bits in the data, e.g., NFA field. If the parity bit indicated an error, then the one or more FCBs following the FCB may be lost in step 903. In one embodiment, the one or more FCBs that are lost in packet processor 100 may be located by a background mechanism and returned to FCB free queue 222. Upon losing the one or more FCBs following the FCB with the detected error to FCB free queue 222 in step 903, the FCB associated with the next frame of data to be transmitted may be read by PCB 224 in step 901.

If the parity bit did not indicate an error in step 902, then the entry of the first BCB, e.g., BCB 600, associated with the FCB read in step 901 may be read by PCB 224 in step 904. The first BCB, e.g., BCB 600, associated with the FCB read in step 901 may be identified by reading the address of the first BCB in the second entry of the FCB as described in U.S. patent application Ser. No. 09/791,336, filed on Feb. 23, 2001, entitled "Linking Frame Data by Inserting Qualifiers in Control Blocks".

In step 905, a determination is made as to whether the parity bit in the BCB, e.g., BCB 600, associated with the FCB read in step 901, indicated an error in the writing and/or reading of the information in the fields of the BCB, e.g., BCB 600. If the parity bit indicated an error, then the one or more BCBs following the BCB comprising the parity bit that indicated an error in the frame, i.e., BCBs associated with the FCB read in step 901, may be lost in step 906. In one embodiment, the one or more BCBs that are lost in packet processor 100 may be located by a background mechanism and returned to BCB free queue 226. In step 907, the BCNT field in the FCB read in step 901 may be updated to indicate the byte count length of the BCBs now currently associated with the FCB read in step 901. Upon updating the BCNT field of the FCB read in step 901, the FCB associated with the next frame of data to be transmitted may be read by PCB 224 in step 901.

Referring to step 905, if the parity bit did not indicate an error, then a determination is made as to whether the BCB, i.e., the BCB whose parity bit was checked in step 905, is the last BCB associated with the FCB, i.e., FCB read in step 901, in step 908. If the BCB, i.e., the BCB whose parity bit was checked in step 905, was not the last BCB associated with the FCB, i.e., FCB read in step 901, then the entry of the next BCB associated with the FCB, i.e., FCB read in step 901, may be read by PCB 224 in step 909. Upon reading the entry of the next BCB, e.g., BCB 600, associated with the FCB, i.e., FCB read in step 901, a determination is made in step 905 as to whether the parity bit in the next BCB, e.g., BCB 600, associated with the FCB, i.e., FCB read in step 901, indicated an error in the writing and/or reading of the information in the fields of the next BCB, e.g., BCB 600.

Referring to step 908, if the BCB, i.e., the BCB whose parity bit was checked in step 905, was the last BCB associated with the FCB, i.e., FCB read in step 901, then the FCB associated with the next frame of data to be transmitted may be read by PCB 224 in step 901.

Although the method and system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A system comprising:
    a processor configured to process frames of data, wherein said processor comprises:
        a plurality of buffers configured to store said frames of data, wherein each frame of data is associated with a frame control block;
        a first queue configured to store one or more frame control blocks associated with one or more frames of data; and
        a second queue configured to store one or more frame control blocks not associated with a frame of data;
        wherein said one or more frame control blocks associated with said one or more frames of data in said first queue comprise a bit for storing a parity value, wherein said one or more frame control blocks in said second queue comprise a plurality of bits for storing a code of an error correction code scheme.

2. The system as recited in claim 1, wherein each frame control block associated with a frame of data is associated with one or more buffer control blocks, wherein each buffer control block associated with said frame control block is associated with a particular buffer of said plurality of buffers.

3. The system as recited in claim 2 further comprising:
    a third queue configured to store one or more buffer control blocks not associated with said particular buffer of said plurality of buffers.

4. The system as recited in claim 3, wherein said one or more buffer control blocks in said third queue comprise a plurality of bits for storing said code of said error correction code scheme, wherein each of said one or more buffer control blocks associated with each of said one or more frame control blocks in said first queue comprises said bit for storing said parity value.

5. A method for using a parity bit in a frame control block associated with a frame of data received comprising the steps of:
    reading said frame control block associated with said frame of data received, wherein said frame control block is configured to describe said frame of data; and
    determining whether said parity bit in said frame control block indicated an error;
    wherein if said parity bit in said frame control block indicated said error then one or more frame control blocks following said frame control block in a first queue are lost.

6. The method as recited in claim 5 further comprising the step of:
    locating and returning said lost one or more frame control blocks following said first frame control block to a second queue for storage.

7. The method as recited in claim 5 further comprising the step of:

reading a next frame control block associated with a next frame of data to be transmitted if said parity bit in said frame control block indicates said error.

8. The method as recited in claim 5 further comprising the step of:

reading a first buffer control block associated with said frame control block if said parity bit in said frame control block did not indicate said error, wherein said first buffer control block is configured to describe a particular buffer.

9. The method as recited in claim 8 further comprising the step of:

determining whether a parity bit in said first buffer control block indicated said error.

10. The method as recited in claim 9 further comprising the step of:

losing one or more buffer control blocks following said first buffer control block if said parity bit in said first buffer control block indicated said error.

11. The method as recited in claim 10 further comprising the step of:

locating and returning said lost one or more buffer control blocks following said first buffer control block to a third queue for storage.

12. The method as recited in claim 10 further comprising the step of:

updating a field of said frame control block to indicate an updated byte count length of one or more buffer control blocks associated with said frame control block.

13. The method as recited in claim 12 further comprising the step of:

reading a next frame control block associated with a next frame of data to be transmitted.

14. The method as recited in claim 9 further comprising the step of:

determining whether there are more buffer control blocks associated with said frame control block if said parity bit in said first buffer control block did not indicate said error.

15. The method as recited in claim 14 further comprising the step of:

reading a next frame control block associated with a next frame of data to be transmitted if there are no more buffer control blocks.

16. The method as recited in claim 14 further comprising the step of:

reading a next buffer control block associated with said frame control block if there are more buffer control blocks associated with said frame control block, wherein said next buffer control block is configured to describe another particular buffer.

17. The method as recited in claim 16 further comprising the step of:

determining whether a parity bit in said next buffer control block indicated said error.

18. The method as recited in claim 17 further comprising the step of:

losing one or more buffer control blocks following said next buffer control block if said parity bit in said next buffer control block indicated said error.

19. The method as recited in claim 18 further comprising the step of:

updating a field of said frame control block to indicate an updated byte count length of one or more buffer control blocks associated with said frame control block.

20. The method as recited in claim 19 further comprising the step of:

reading a next frame control block associated with a next frame of data to be transmitted.

21. The method as recited in claim 17 further comprising the step of:

determining whether there are more buffer control blocks associated with said frame control block if said parity bit in said next buffer control block did not indicate an error.

22. The method as recited in claim 21 further comprising the step of:

reading a next frame control block associated with a next frame of data to be transmitted if there are no more buffer control blocks.

* * * * *